United States Patent [19]

Marechal et al.

[11] Patent Number: 4,899,037
[45] Date of Patent: Feb. 6, 1990

[54] MAGNETIC INFORMATION-RECORDING ELEMENT AND METHOD OF MANUFACTURE

[75] Inventors: Claude Marechal; Christian Schmuckle, both of Paris, France

[73] Assignee: Eastman Kodak Company, Rochester, N.Y.

[21] Appl. No.: 150,419

[22] PCT Filed: Apr. 23, 1987

[86] PCT No.: PCT/EP87/00224

§ 371 Date: Jan. 19, 1988

§ 102(e) Date: Jan. 19, 1988

[87] PCT Pub. No.: WO87/06745

PCT Pub. Date: Nov. 5, 1987

[30] Foreign Application Priority Data

Apr. 28, 1986 [FR] France ................................ 8606238

[51] Int. Cl.⁴ .......................................... G06K 19/06
[52] U.S. Cl. ....................................... 235/493; 283/82
[58] Field of Search ................... 235/493; 283/82, 109

[56] References Cited

U.S. PATENT DOCUMENTS 3,902,262 9/1975 Colegrove et al. .................. 283/82
4,356,391 10/1982 Takeda ................................ 235/493
4,752,676 6/1988 Leonard et al. ................ 235/493 X

FOREIGN PATENT DOCUMENTS 2170944 9/1973 France .
2230262 12/1974 France .
2372476 6/1978 France .
1516832 7/1978 United Kingdom .
2006112 5/1979 United Kingdom .
2129738 5/1984 United Kingdom .

*Primary Examiner*—David L. Trafton
*Attorney, Agent, or Firm*—Bernard D. Wiese

[57] ABSTRACT

Information-recording elements having a support coated with a layer having one or more magnetic information-recording tracks in in contact and adjacent to one or more non-magnetic tracks. Such elements are used as magnetic information-recording components of articles, for example, credit cares, bank cards and the like. They can comprise a layer coextensive to with layer containing the tracks to protect the tracks and mask them from view for security purposes. The tracks are coated from compositions that contain dispersed particles and have flow properties adapted to provide sharply delineated edges. The tracks can be coated on a support that is laminated to another support to form an information-recording article or they can be coated on a temporary support and transferred to another support to form such article.

12 Claims, 2 Drawing Sheets

MAGNETIC INFORMATION-RECORDING ELEMENT AND METHOD OF MANUFACTURE

TECHNICAL FIELD

The present invention relates to a magnetic information-recording element, its manufacture and use in information-recording articles such as magnetically encodable cards, for example, credit cards.

Information recording articles such as credit cards, bank cards, employee identification passes and the like can comprise of a plastic or a plastic-coated cardboard support on which is printed or embossed the bearer's name and other information. They also comprise one or more information recording tracks, such as magnetic tracks, that are intended to receive coded information. These tracks must be precisely dimensioned and their edges parallel and well defined. They must also adhere well to the support and not separate from it under normal conditions of use. The surface of the card must be substantially planar and the tracks must neither project above the card surface in order to avoid abrasion and to allow stacking in reading devices, nor be deeply recessed within the card at a sacrifice of read-out signal strength.

BACKGROUND ART

In the manufacture of magnetic tapes and the like it is known to coat magnetic layers or stripes using a coating composition comprising dispersed magnetic particles, a binder polymer and an organic liquid. The coating is dried or cured by heating and is then calendered by passage through the nip of smooth calendering rolls. The latter operation increases the compactness of the magnetic layer and, therefore, its magnetic efficiency. It also improves the microsmoothness of the layer surface and reduces the noise in the reproduced signal.

Known processes for manufacturing magnetic cards suffer from various disadvantages. For example, in the silk-screening method of forming magnetic tracks described in U.S. Pat. No. 4,100,011, the magnetic particles tend to be oriented perpendicularly to the card surface. This reduces the frequency response of the recorded information.

Magnetic tracks can also be extruded on the support or deposited in grooves in the support and then calendered, as described in French Pat. No. 1,588,133 (corresponding to U.K. Pat. No. 1,180,356). A drawback of such methods is that the thickness and edge definition of the tracks are difficult to control. Furthermore, the organic liquids normally used for coating magnetic compositions, may attack the usual kinds of thermoplastic supports and distort their planarity.

The growing use of magnetic cards has led to continual searches for improvements. In particular, it is often desired to mask one or more magnetic tracks from view by covering such tracks with an opaque masking layer. Such masking is intended to strengthen coding inviolability and to protect the magnetic track against abrasion. The masking layer, however, must not excessively reduce the signal picked up by reading heads. The masking of magnetic tracks tends to reduce performance by increasing the spacing between the reading head and the track. This influence of head and track separation is well known.

The simultaneous maintenance of magnetic performance and improvement of inviolability constitute contradictory requirements that are difficult to meet, since the card usually comprises several tracks having unequal magnetic and geometric characteristics. The masking overcoat may unequally affect these characteristics.

Conceivably, tracks that are not coplanar could be concealed by a thick masking overcoat. However, a serious disadvantage would be that such a thick coating would reduce the magnetic efficiency of the recording article. In the present invention, the tracks can be concealed without serious loss of magnetic efficiency. An information-recording article such as a multitrack card can be masked with an opaque layer of minimum thickness which protects the card without causing excessive signal loss. This result can be achieved by using a novel element of this invention as an intermediate element in manufacturing such a card. The use of the intermediate element also permits the tracks to be deposited on a final support that is used in the information recording article without distorting such support. Often organic liquids (solvents or dispersant media) used for coating magnetic dispersions, distort the thermoplastic polymeric support that is normally used for a credit card or a bank card by dissolving or swelling it. As described herein, an element of this invention can be used as an intermediate element to prepare such a card and avoid the application of harmful solvents to the final support.

DISCLOSURE OF INVENTION

This invention provides a magnetic information recording element comprising a support having thereon a coated layer of at least one magnetic information recording track in contact and adjacent to at least one non-magnetic track, the magnetic tracks comprising dispersed magnetic particles and the non-magnetic tracks comprising dispersed non-magnetic particles. Also, the magnetic information recording track can be in contact at each edge thereof with non-magnetic tracks. In addition, the element can have a coextensive layer that is in contact with the coated layer of tracks and has sufficient opacity to mask at least one of the tracks from view.

This invention also provides a method of preparing an information-recording element which comprises simultaneously coating on a support, at least one magnetic information-recording track in contact and adjacent to at least one non magnetic track. The coating compositions for the magnetic and non-magnetic tracks comprise particles dispersed in a polymeric binder. The flow properties of the compositions for the tracks are adapted to provide a magnetic track having sharply delineated edges.

BEST MODE OF CARRYING OUT THE INVENTION

Figure 1:
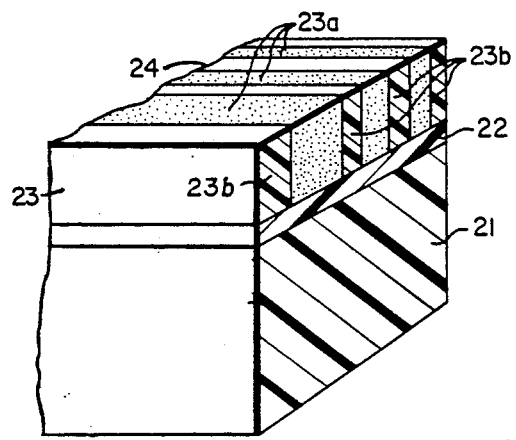
FIG. 1 is a diagrammatic perspective view in section of an element of the invention; particularly desirable when the manufacture of an information-recording article includes a transfer step as shown in FIG. 2.

The coating of non-magnetic tracks with magnetic tracks in accordance with this invention provides more than one benefit. First, it aids in controlling the edges of the magnetic tracks. This is important because a uniform magnetic signal requires a magnetic track of uniform width. If the track has a ragged, uneven edge, the signal will be uneven. The non-magnetic tracks reduce or eliminate this problem.

A second benefit is that the non-magnetic tracks aid in concealing the location of the magnetic tracks, thus improving the inviolability of such magnetic tracks. This is true whether or not the tracks are covered by an opaque masking layer. Thus, if there is no masking layer, the side-by-side coating of coplanar magnetic and non-magnetic tracks of the same color helps to conceal the exact location of the magnetic tracks. Alternatively if there is an overlying masking layer, the presence of coplanar non-magnetic tracks helps to conceal the location of the magnetic tracks. Thus, if a magnetic track, or two or more separate magnetic tracks with no non-magnetic tracks, were overcoated with a masking layer, the position of the tracks would be obvious from the visible differences in the level of the overcoat at the track locations. By providing coplanar magnetic and non-magnetic tracks in accordance with the invention, the location of the magnetic tracks is not visible when they are covered by an opaque layer.

The compositions used to coat the magnetic tracks and non-magnetic tracks of the composite element are usually formed by dispersing magnetic and non-magnetic particles respectively in a polymeric binder and an organic liquid. By selecting appropriate binders, appropriate magnetic and non-magnetic particles and appropriate particle/binder ratios, tracks of substantially same compactability and compressibility are obtained. Accordingly, they have identical behavior when calendered, or compressed by other means such as a heated plate press as may be used in preparing a credit card. The resulting element has a smooth surface layer with sharply-edged tracks, and the magnetic characteristics are modified equally by calendering.

The magnetic tracks can contain magnetic particles such as metallic alloys or metal oxides, in particular ferroso-ferri iron oxides, gamma ferric oxides and barium ferrites. Particularly advantageous magnetic oxides are iron oxides whose preparation is described in French Patent Application 8,016,332 (corresponding U.S. Pat. No. 4,376,714) and in European Patent Application 81,401,126.8. For credit cards, the magnetic materials have an average coercivity usually in the range of 300 to 600 Oe but higher coercivities could also be used. In any event, the particles used are those that provide magnetic tracks whose characteristics are such that coercivity and magnetization correspond to the standard specifications for the cards to be produced.

The polymeric binder used for the magnetic track can be selected from the various polymers or copolymers generally used for this purpose and include, for example, vinyl acetate or vinyl chloride copolymers, acrylic and methacrylic ester polymers, polyurethanes, polyethylenes, particularly halogenosulfonated polyethylenes and more particularly chlorosulfonated polyethylenes. Suitable organic liquids that are used in the coating composition with the binders include, for example, methyl ethyl ketone, methyl isobutyl ketone, ethyl acetate, cyclohexanone acetone, ethyl alcohol, benzene and the like. These materials are well known dispersion media or solvents in such coating compositions. The same or different organic liquids can be used in the coating composition for the non-magnetic tracks and for other layers such as masking layers.

The binder normally comprises about 5 to 50 weight percent and preferably 10 to 20 weight percent of the magnetic particle mass. These ratios depend however on the type of particles, on the volume of the particles relative to the volume of the fluid phase and on the type of binder. The binders themselves are selected for their compatibility with the layer components, their adhesion to adjacent layers, their flexibility upon calendering, etc. These criteria are also used for selecting the binder of the masking layer and are well known to those skilled in the art.

The choice of the components of the non-magnetic tracks (i.e. the binder, the particles dispersed therein) and of the particle/binder ratio is such that the non-magnetic tracks formed in the method of the invention have physical and mechanical characteristics similar to those of the magnetic tracks they border, particularly as regards thickness, resiliency, compactability, compressibility, behavior upon calendering and advantageously, hue. The normally skilled man will make this selection among the well-known and numerous materials available in this technology. For instance, such tracks comprise as an inert filler non-magnetic particles, especially non-magnetic iron oxides possibly with other oxides such as titanium dioxide, zinc oxide and alumina, which results in tracks whose color is similar to that of magnetic tracks. The preferred non-magnetic iron oxides are anhydrous goethite which has a yellow color and hematite which has a red color. The non-magnetic particles are normally used in sizes and shapes comparable to those of the magnetic particles.

The non-magnetic tracks can comprise a binder similar to or different from that of the magnetic tracks, provided the selected compounds meet the criteria of coating compatibility, adhesion and resistance to physical damage. They advantageously contain the same binder as the magnetic tracks, with similar ratios, i.e., the binder mass is about 5 to 50 weight percent and advantageously about 10 to 20 weight percent of the non-magnetic particle mass.

As previously indicated, the flow properties of the compositions employed to form the magnetic and non-magnetic tracks are adapted to provide magnetic tracks having sharply delineated edges. These edges are magnetically sharply delineated to provide a uniform magnetic signal. The flow properties of the coating compositions can be conveniently expressed in terms of their yield value. The yield value can be defined as the minimum stress required to fluidize or cause the flow of a composition at rest. This is different from viscosity as an initially very viscous composition can be fluidized by applying large or small stress depending on the components. The yield value is expressed in dynes/cm$^2$ and is conveniently measured by means of a cone and plate Ferranti-Shirley viscometer. Such a viscometer is recognized in the art as being particularly appropriate for measuring the flow characteristics of pseudo-plastic compositions of the type used in coating the magnetic and non-magnetic tracks according to this invention. Using a Ferranti-Shirley viscometer appropriate flow curves, i.e., variation in shear stress versus shear rate, can be plotted and the yield values and viscosities determined in the manner well known to those skilled in the art.

The magnetic and non-magnetic coating compositions generally have substantially equal yield values that are in the range of about 200 to 450 dynes/cm² and advantageously in the range of 300 to 350 dynes/cm². For magnetic coating compositions of the type disclosed these values correspond to viscosities in the range of about 40 to 80 mPa.s and, for the non-magnetic coating compositions to viscosities in the range of 100 to 150 mPa.s.

Specific techniques for adjusting the flow properties of the coating compositions for the magnetic and non-magnetic tracks will be obvious to those skilled in the art in light of the teachings in this description. Obtaining flow properties in the non-magnetic coating composition that are compatible with those in the magnetic coating composition is more readily achieved by using non-magnetic particles that have shapes and sizes that are substantially equal to those of the magnetic particles used in the magnetic coating compositions although other techniques known to those skilled in the art may be employed to achieve the desired flow properties.

In general, the coated layer of magnetic and non-magnetic tracks has a dry thickness in the range of about 15 μm to 30 μm, advantageously in the range of 20 μm to 25 μm. In this layer, the width and thickness of a magnetic track can vary with the nature of magnetic materials, of binders, etc., and also with the standards for card manufacturing and use.

A preferred element of the invention includes a thin opaque, non-magnetic masking layer. Such a layer can contain an opacifying agent or a pigment such as titanium dioxide, zinc oxide, barium sulfate or alumina dispersed in an appropriate binder, for example, a phenoxy resin, a vinylic polymer such as polyvinyl-butyral, a polyester or a polycarbonate. This layer can also contain a compatible dye. The hue of the dye is optional. Usually a phthalocyanine dye such as copper phthalocyanine is selected because of its thermal stability. The respective ratios of pigment and dye are adjusted according to the desired final color and the opacity. The binder ratio is adjusted to obtain the desirable mechanical qualities, particularly to provide the necessary wear resistance upon contact with reading heads. The mass of the binder present in the layer is generally about 20 to 80 weight percent and advantageously about 40 to 60 weight percent of the opacifying agent mass.

The masking layer has sufficient opacity to mask the magnetic and non-magnetic tracks from view when present as a surface layer in an information-recording article. It is thin, usually between 0.5 μm and 5 μm (advantageously between 1 and 3 μm) thick. This layer is thick enough to protect and mask the magnetic and non-magnetic tracks but without being so thick as to cause an unacceptable loss of signal.

The coating compositions used for the various layers of the element of this invention can contain surfactants or dispersants to make it easier to coat such layers on supports and to improve the behavior of these layers upon drying.

FIG. 1 illustrates a coated element of this invention. This element comprises a temporary support 21 having coated thereon, in order from the support, a non-magnetic layer 22 which may be an opaque masking layer, a layer 23 comprising magnetic tracks 23a in contact at each edge of the track with non-magnetic tracks 23b. The number of magnetic tracks can vary. In FIG. 1 given as an example, the number of tracks is three. These tracks can have different widths and/or different thicknesses, provided, however, that the different tracks are coplanar at the surface in contact with the masking layer in the final information-recording article. This means that if one track is thicker than another, a portion of it would have to be imbedded more deeply in the final support than a thinner track. In this embodiment support 21 of the element is advantageously a thin polyester film that can be processed in known magnetic tape coating apparatus and is impervious to the organic liquid or liquids used as solvents or dispersing media in the coating compositions for the tracks.

The information-recording elements of this invention can be used in the manufacture of information-recording articles such as magnetic cards in several ways. For example, the element shown in FIG. 1 can be used in the following manner. Surface 24 of layer 23 of the composite element comprising magnetic tracks 23a and non-magnetic tracks 23b, is contacted with the surface of a thermoplastic substrate such as a thick sheet of thermoplastic poly(vinyl chloride). Support 21 is stripped away and the thin non-magnetic masking layer 22 is at the surface of the resulting information-recording article.

Figure 2:
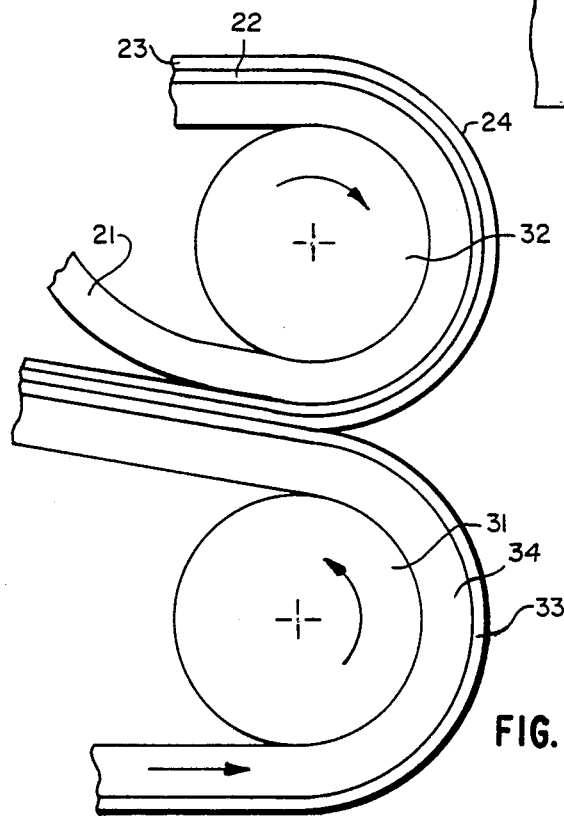
FIG. 2 is a diagrammatic view of a method of manufacture in accordance with the invention involving the transfer of tracks to a permanent support.

This operation can be carried out on a calendering machine such as shown in FIG. 2, which presses and heats both supports between pairs of polished steel rollers 31 and 32. This calendering machine can be provided with delaminating means, not shown in the drawing, i.e., means facilitating the separation of the composite of coated layers from the temporary support 21. To facilitate the adhesion of the composite on the final support 34, the latter can be provided with a heat sealable primer subbing layer 33 of known composition.

Figure 3:
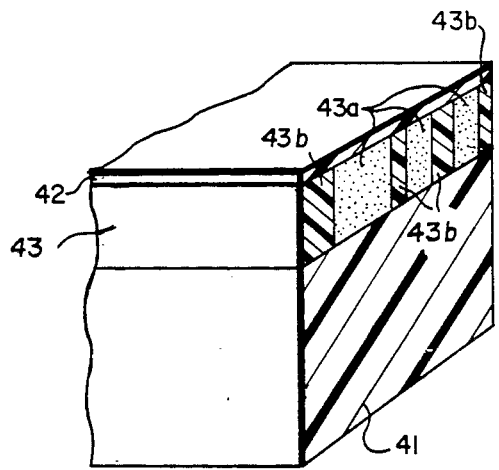
FIG. 3 is a diagrammatic perspective in section of another element of the invention.

According to another embodiment of the invention as shown in FIG. 3, the element of the invention comprises a support 41, having thereon, in order from the support, a layer 43 comprising magnetic tracks 43a and non-magnetic tracks 43b and a non-magnetic opaque layer 42. In this embodiment of the invention, the composite element is placed with its support 41 contacting the substrate which is to be used as final support for the information-recording article and then the whole is sealed by heat pressing.

In any case, the element containing the coated layer of magnetic tracks and non-magnetic tracks and the thin opaque non-magnetic layer is incorporated by heat pressing into a thermoplastic final substrate which may or may not be pre-printed with information identifying the information-recording article and its owner. The article thus obtained comprises magnetic tracks for magnetic coding of required information. These tracks are protected by the thin opaque non-magnetic layer, which masks the magnetic tracks and also is a protective layer. According to one embodiment, the information-recording article is a bank card comprising three parallel magnetic tracks separated by non-magnetic tracks. The magnetic tracks are in accordance with the standards specified by the French National Center for Telecommunication Studies (Centre National d'Etudes des Télé communications) and the International Standards Organization (ISO).

Figure 4:
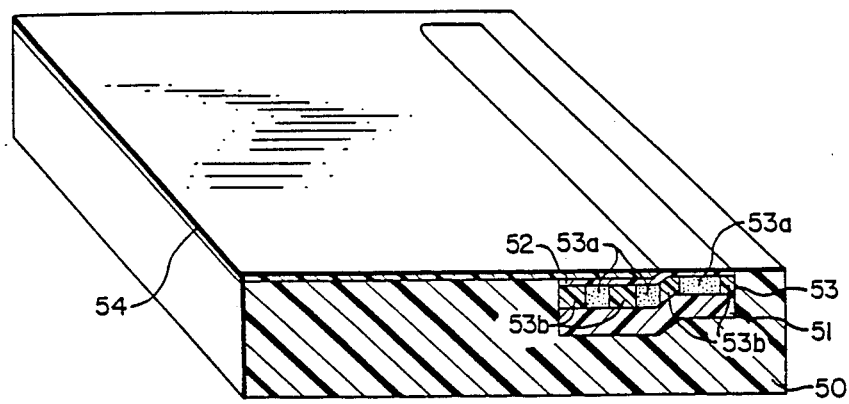
FIG. 4 is a diagrammatic view in section of an information-recording article such as a credit card incorporating an element of this invention.

FIG. 4 illustrates an information-recording article such as a credit card incorporating as one component thereof, an information-recording element of this invention. In this illustration, the specific application of the article requires that one of the magnetic tracks 53a be overcoated only with a thin opaque masking layer 52 while the other magnetic tracks 53a be overcoated with an additional layer bearing, for example, printed information of the issuing agency for the article. In FIG. 4 a support 50 such as thermoplastic poly(vinyl chloride) has incorporated therein support 51 of the information-recording element having coated thereon layer 53 comprising a plurality of alternating magnetic information-recording tracks 53a and non-magnetic tracks 53b. The magnetic and non-magnetic tracks are all overcoated with a non-magnetic opaque layer 52. An additional layer 54 that can be used to receive printed information, e.g., by silk-screen printing techniques, is positioned over two of the magnetic tracks 53a and a portion of opaque layer 52. The use of an additional layer such as layer 54 over a magnetic track reduces the intensity of a read-back signal from the magnetic track due to its increased separation from the reading head. The coating technique employed in the practice of this invention permits any magnetic tracks that are to be overcoated by two layers such as layers 52 and 54 to be increased in thickness relative to magnetic tracks that are to be overcoated with only one such layer. This increased thickness provides a high magnetic flux to compensate for the added overcoat.

The information-recording element of this invention is prepared by coating the composite layers in the desired order on a support. The process comprises coating a layer such as an opaque non-magnetic masking layer and magnetic and non-magnetic tracks using known devices such as coating hoppers. Preferably, a multi-hopper as illustrated in FIG. 5 is used to simultaneously coat the magnetic and non-magnetic tracks and the masking layer.

It will be apparent to those skilled in the art that for best control of track edges and of thicknesses of the cross-sections of magnetic and non-magnetic tracks, they should all be deposited as nearly simultaneously as possible while all tracks are wet, and they should be dried also simultaneously. Also, the coating compositions should have controlled flow characteristics, such that there is no intermixing of the several tracks. The multihopper of FIG. 5 facilitates this method of manufacture.

The magnetic and non-magnetic tracks are coated by hopper elements especially adjusted to the width and the thicknesses of the tracks. In this way one can control the pressure drops through the several coating orifices for compatibility with the coating compositions, and for controlling the widths and thicknesses of the tracks as required by the final product.

Figure 5:
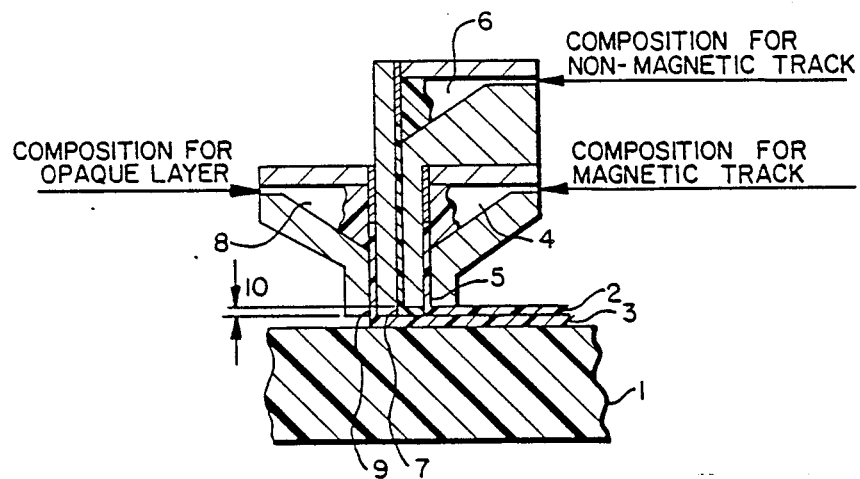
FIG. 5 is a diagrammatic view in section of a coating operation in accordance with the invention.

FIG. 5 schematically represents a coating device that can be used for preparing information-recording elements according to this invention. In FIG. 5 a coating device for simultaneously applying to a support 1 a layer 2 of magnetic and non-magnetic tracks and a second layer 3 which, in this specific case, is an opaque layer. In this arrangement the magnetic coating composition is introduced into a cavity 4 under pressure for extrusion via slot 5. Slot 5 is constructed or provided with suitable shims to define the width of the magnetic track or tracks as coated and also to provide the proper flow constriction such that the flow is controlled to provide the desired track thickness in layer 2. Similarly, the non-magnetic coating composition is introduced to cavity 6 under pressure for extrusion via slot 7 which is constructed or provided with suitable shims to to define the non-magnetic tracks and place them in juxtaposition with the magnetic track or tracks as both the non-magnetic and magnetic tracks are formed in layer 2. When all magnetic tracks are coated from a single formulation and all non-magnetic tracks are coated from a single formulation, the cavities for each formulation may feed a multiplicity of coating slots, each slot having appropriate dimensions to provide the desired track width, thickness and location under the common feeding pressure. When magnetic compositions having different magnetic recording capabilities are desired, the coating hopper can be compartmented to provide separate cavities to feed the required magnetic coating composition to the appropriate slot or slots. The coating composition for the opaque layer is introduced to cavity 8 and is extruded through slot 9 to deposit directly on support 1. The additional protrusion indicated by dimension 10 controls the positioning of the opaque layer 3 under layer 2. It is obvious that the manufacture of an information-recording element as depicted in FIG. 3 would require the coating hopper depicted in FIG. 5 to be modified so that layer 2 containing the magnetic and non-magnetic tracks would be positioned between opaque layer 3 and support 1. After coating, the element normally passes through a drying device not shown in the drawing.

As previously indicated herein, the flow properties of the coating compositions described herein can be expressed in terms of their yield value determined in a conventional manner using a Ferranti-Shirley viscometer. A suitable procedure for making this determination with the coating compositions of the Examples set forth hereinafter is as follows:

The appropriate coating composition is tested on a Ferranti-Shirley viscometer, employing the large (3.5 cm radius) cone at a maximum rotational velocity of 100 rpm producing 1800 sec$^{-1}$ maximum shear rate. A flow curve is generated with a 120 second sweep (120 seconds increasing from zero to 1800 sec$^{-1}$ shear rate, and 120 seconds decreasing to zero again). According to the standardized and recommended operating procedure, the cycle is immediately repeated, and the measurements taken from the second cycle to provide a consistent prior history for all samples. The viscosity in mPa.s is read as the reciprocal of the slope tangent to the curve at 1000 sec$^{-1}$. The yield value is read in dynes/cm$^2$ as the interval along the shear-stress axis between the origin of the ascending-sweep curve and the intersection where the descending-sweep curve crosses the ascending trace.

In the following Examples, the coating compositions for the magnetic tracks and the non-magnetic tracks are formulated to provide magnetic tracks having sharply delineated edges. These magnetic tracks provide a uniform signal with a test signal recorded and reproduced in a conventional bank card recorder. In addition, the magnetic and non-magnetic tracks have substantially the same compressibility and provide a smooth coplanar surface upon calendering.

The following Examples are set forth hereinafter to further illustrate this invention.

EXAMPLE 1

A coating composition for an opaque pigmented layer to be used to mask a layer containing magnetic and non-magnetic tracks, is prepared as follows:

| | |
|---|---|
| Copper phthalocyanine* | 50 g |

| | |
|---|---|
| Titanium oxide | 50 g |
| Phenoxy resin** | 56 g |
| Methyl ethyl ketone | 550 ml |
| Cyclohexane | 55 ml |
| Dispersing agent*** | 3 g |

*Lutetia blue sold by Imperial Chemical Industries
**Phenoxy resin PKHH sold by Union Carbide Corp.
***Gafac PE SIO sold by GAF Corp.

This composition is mixed for 120 hours at ambient temperature in a steel ball mill. The viscosity is 25 mPa.s and the yield value is 100 dynes/cm².

The following coating composition intended for magnetic tracks is prepared as follows:

| | |
|---|---|
| Magnetic iron oxide (gamma Fe₂O₃) | 100 g |
| Chlorosulfonated polyethylene* | 15 g |
| Methyl isobutyl ketone | 210 ml |

*Chlorosulfonated polyethylene available as Hypalon sold by I. E. DuPont

This composition is mixed for 160 hours at ambient temperature in a steel ball mill. The iron oxide (gamma Fe₂O₃) is prepared according to the method described in French Pat. No. 8,016,332 (corresponding U.S. Pat. No. 4,376,714). Its coercivity as a powder is 450 Oe and its magnetization 87.9 milliteslas. After milling, the oxide coercivity is 320 Oe. The viscosity is 40 mPa.s and the yield value is 340 dynes/cm².

The following composition for non-magnetic tracks is prepared as follows:

| | |
|---|---|
| Non-magnetic iron oxide (α-hematite) | 25 g |
| Titanium oxide | 75 g |
| Chlorosulfonated polyethylene | 20 g |
| Methyl isobutyl ketone | 300 ml |
| Dispersing agent | 3 g |

This composition is mixed for 120 hours at ambient temperature in a steel ball mill. The viscosity is 100 mPa.s and the yield value is 260 dynes/cm².

Using a coating device of the type shown in FIG. 5, the following layers are coated using the compositions described at ambient temperature. The layers are coated in the order, the blue pigmented layer and then the layer comprising three magnetic tracks and alternating non-magnetic tracks, on a poly(ethylene terephthalate) support (thickness 23 μm). The coated element is then passed through a drying device at 40°-60° C. for one minute. The thickness of the blue pigmented layer and of the layer of tracks before calendering are, respectively, 1.5 μm and 22 μm. The widths of the magnetic tracks are, respectively, 11.5, 3 and 3 mm and the total width of the coated element is 28 mm.

EXAMPLE 2

The procedure of Example 1 is repeated except that composition for the opaque pigmented layer is the following:

| | |
|---|---|
| Copper phthalocyanine* | 40 g |
| Titanium oxide | 40 g |
| Poly(vinyl butyral)** | 45 g |
| Ethyl alcohol | 700 ml |
| Dispersing agent*** | 3 g |

*"Lutetia blue" sold by Imperial Chemical Industries
**"Butvar B-74" sold by Monsanto Corp.
***"Multiflow" sold by Monsanto Corp.

The viscosity of the composition is 30 mPa.s and the yield value is 115 dynes/cm², determined using a Ferranti-Shirley viscometer as described hereinbefore.

EXAMPLE 3

The procedure of Example 1 is repeated with the following modifications:

The coating composition for the pigmented opaque layer is as follows:

| | |
|---|---|
| Copper phthalocyanine | 60 g |
| Titanium oxide | 40 g |
| Poly(vinyl butyral)* | 56 g |
| Methyl isobutyl ketone | 750 ml |

*"Butvar-76" sold by Monsanto Corp.

The viscosity is 30 mPa.s and the yield value is 110 dynes/cm².

Using the procedure of Example 1, the layers are coated simultaneously in the order; the layer of tracks and the opaque layer, on a poly(vinyl chloride) support* whose thickness is 20 μm.

*Sold by Consortium General des Plastiques and Socotep.

EXAMPLE 4

The procedure of Example 1 is repeated except that the coating composition of the non-magnetic tracks is as follows:

| | |
|---|---|
| Iron oxide (non-magnetic α-hematite) | 20 g |
| Iron oxide (non-magnetic anhydrous goethite) | 80 g |
| Chlorosulfonated polyethylene | 20 g |
| Methyl isobutyl ketone | 380 ml |

The viscosity is 120 mPa.s and the yield value is 300 dynes/cm².

EXAMPLE 5

The procedure of Example 1 is repeated except that the coating composition for the magnetic tracks is:

| | |
|---|---|
| Magnetic iron oxide | 100 g |
| Chlorosulfonated polyethylene | 25 g |
| Methyl isobutyl ketone | 250 ml |

The viscosity is 50 mPa.s and the yield value is 350 dynes/cm².

EXAMPLE 6

The element coated in Example 1 is used for preparing a bank card. The coated face of the element is contacted with a 30 μm thick poly(vinyl chloride) support having thereon a thermosealable primer layer formed of poly(vinyl chloride-vinyl acetate) ("Rhodopas M", sold by Rhone-Poulenc). The coated element and the primer layer of the support are placed against each other as shown in FIG. 2 and calendered under a roller pressure of 280 kPa, at 60° C. and at a speed of 25 m/mn. The compressibility of the tracks is substantially the same.

These conditions bring about the transfer and the adhesion of the composite of coated layers from the element of Example 1 onto the poly(vinyl chloride) support. The polyester support is stripped upon going out of the calendering machine.

The pigmented opaque layer forms the surface of the product which can provide a bank card after appropriate finishing operations such as embossing and encoding.

EXAMPLE 7

In this Example, the coated element of Example 3 is used for preparing a bank card. In this case, the support of the coated element is contacted with a 30 μm poly(vinyl chloride) sheet by heat pressing in a calendering machine.

EXAMPLE 8

The procedure of Example 7 is repeated except that the coated element of Example 5 is used.

The invention has been described in detail with particular reference to preferred embodiments thereof, but it will be understood that variations and modifications can be effected within the spirit and scope of the invention.

What is claimed is:

1. A magnetic information recording element comprising a support having thereon a coated layer of at least one magnetic information recording track in contact and adjacent to at least one non-magnetic track, the magnetic tracks comprising dispersed magnetic particles and the non-magnetic tracks comprising dispersed non-magnetic particles.

2. An element according to claim 1, wherein said magnetic information recording track is in contact at each edge thereof with non-magnetic tracks.

3. An element according to claim 1 or 2, having a layer that is coextensive and in contact with the coated layer of tracks and has sufficient opacity to mask at least one of the tracks from view.

4. An element according to claim 3, wherein the coated layer of tracks comprises a plurality of alternating magnetic information-recording tracks and non-magnetic tracks.

5. The element according to 4, wherein at least one magnetic information-recording track has a thickness greater than another such track.

6. The element according to claim 4, wherein at least one magnetic information-recording track has a recording capability different from another such track.

7. A method of preparing an information-recording element which comprises simultaneously coating on a support, at least one magnetic information-recording track in contact and adjacent to at least one non-magnetic track, (a) the coating compositions for the magnetic and non-magnetic tracks comprising particles dispersed in a polymeric binder and (b) the flow properties of the compositions for the tracks being adapted to provide a magnetic track having sharply delineated edges.

8. The method according to claim 7, wherein the coating compositions for the tracks have flow properties such that their yield values are in the range of about 200 to 450 dynes/cm$^2$ and are substantially equal.

9. The method according to claim 7 or 8, wherein the particles and the binders are such as to provide tracks having substantially equal compressibility.

10. The method according to any of claims 7 to 9, wherein a layer having sufficient opacity to mask at least one of the tracks is coated simultaneously and coextensively with the layer comprising the tracks.

11. The method according to claim 10, wherein the masking layer is coated between the support and the layer comprising the tracks.

12. The method according to claim 11, wherein the coated layers are dried and the surface of the coated layer comprising the tracks is contacted with a receiving element and the composite of coated layers is transferred to the receiving element.

* * * * *